United States Patent [19]

Tokunaga

[11] Patent Number: 5,155,519
[45] Date of Patent: Oct. 13, 1992

[54] CAMERA HAVING A SYNCHRONIZED-SHUTTER-TIME CONTROL DEVICE FOR FLASH PHOTOGRAPHY

[75] Inventor: Tatsuyuki Tokunaga, Kanagawa, Japan

[73] Assignee: Canon Kabushiki Kaisha, Tokyo, Japan

[21] Appl. No.: 791,444

[22] Filed: Nov. 13, 1991

[30] Foreign Application Priority Data

Nov. 20, 1990 [JP] Japan .................... 2-316246

[51] Int. Cl.⁵ .................... G03B 7/00; G03B 15/03
[52] U.S. Cl. .................... 354/413; 354/125; 354/137; 354/147
[58] Field of Search ............ 354/420, 410, 413, 147, 354/146, 120-125, 94-99, 129, 137, 138

[56] References Cited

U.S. PATENT DOCUMENTS

| | | | |
|---|---|---|---|
| 3,088,390 | 5/1963 | Zimmerman | 354/125 |
| 3,757,654 | 9/1973 | Mori | 354/413 |
| 3,987,468 | 10/1976 | Matsuzaki et al. | 354/146 X |
| 4,268,139 | 5/1981 | Uchiyama et al. | 354/147 X |

Primary Examiner—Russell E. Adams
Assistant Examiner—Jae N. Noh
Attorney, Agent, or Firm—Robin, Blecker, Daley & Driscoll

[57] ABSTRACT

A camera is arranged to perform shutter control for flash photography either in a first mode which is for a normal shot or in a second mode in which a shot, particularly a panoramic shot or the like, is to be taken with an image plane partly blocked from light. The camera ensures an adequate flash photography by causing the synchronizing threshold values of shutter time for flash photography to differ with the first mode and the second mode.

8 Claims, 5 Drawing Sheets

CAMERA HAVING A SYNCHRONIZED-SHUTTER-TIME CONTROL DEVICE FOR FLASH PHOTOGRAPHY

BACKGROUND OF THE INVENTION

1. Field of the Invention:

This invention relates to a camera having a synchronized-shutter-time control device for controlling shutter time to be synchronized with flashing in carrying out flash photography.

2. Description of the Related Art:

In carrying out flash photography, it has widely been practiced to avoid an uneven exposure resulting from a so-called slit exposure by controlling shutter time to be longer than a period of time required for fully opening the shutter. Meanwhile, cameras of the kind arranged to permit a so-called panoramic shot by making an exposure on an oblong image plane with a part of the image plane covered with a light blocking member have been announced of late.

Since the image plane is light-blocked in part in making a panoramic shot as mentioned above, the effective length of time required for fully opening the shutter becomes shorter if the shutter in use is of the vertical travel type. In that instance, therefore, the full opening time of the shutter for the panoramic shot differs from the full opening time of the shutter for a normal shot.

SUMMARY OF THE INVENTION

This invention is directed to the solution of the above-stated problem. It is one aspect of the invention under the present application, therefore, to provide a camera which is arranged to set the limit of shutter time for flashing at a shorter time value in the case of a mode of taking a shot with a part of the image plane blocked from light, like the panoramic shot mode, than the limit of shutter time for flashing in a normal shot mode.

It is another aspect of the invention to provide a camera which is arranged to cause the flashing timing of a flash device in the mode of taking a shot with a part of the image plane blocked from light to differ from the flashing timing in a normal shot mode.

These and other aspects and features of this invention will become apparent from the following detailed description of embodiments thereof taken in connection with the accompanying drawings.

BRIEF DESCRIPTION OF THE DRAWINGS

FIGS. 2(a), 2(b) and 2(c) show timing at which the X-sync contact of the synchronized-shutter-time control device of the invention turns on.

DETAILED DESCRIPTION OF THE PREFERRED EMBODIMENTS

Figure 1:
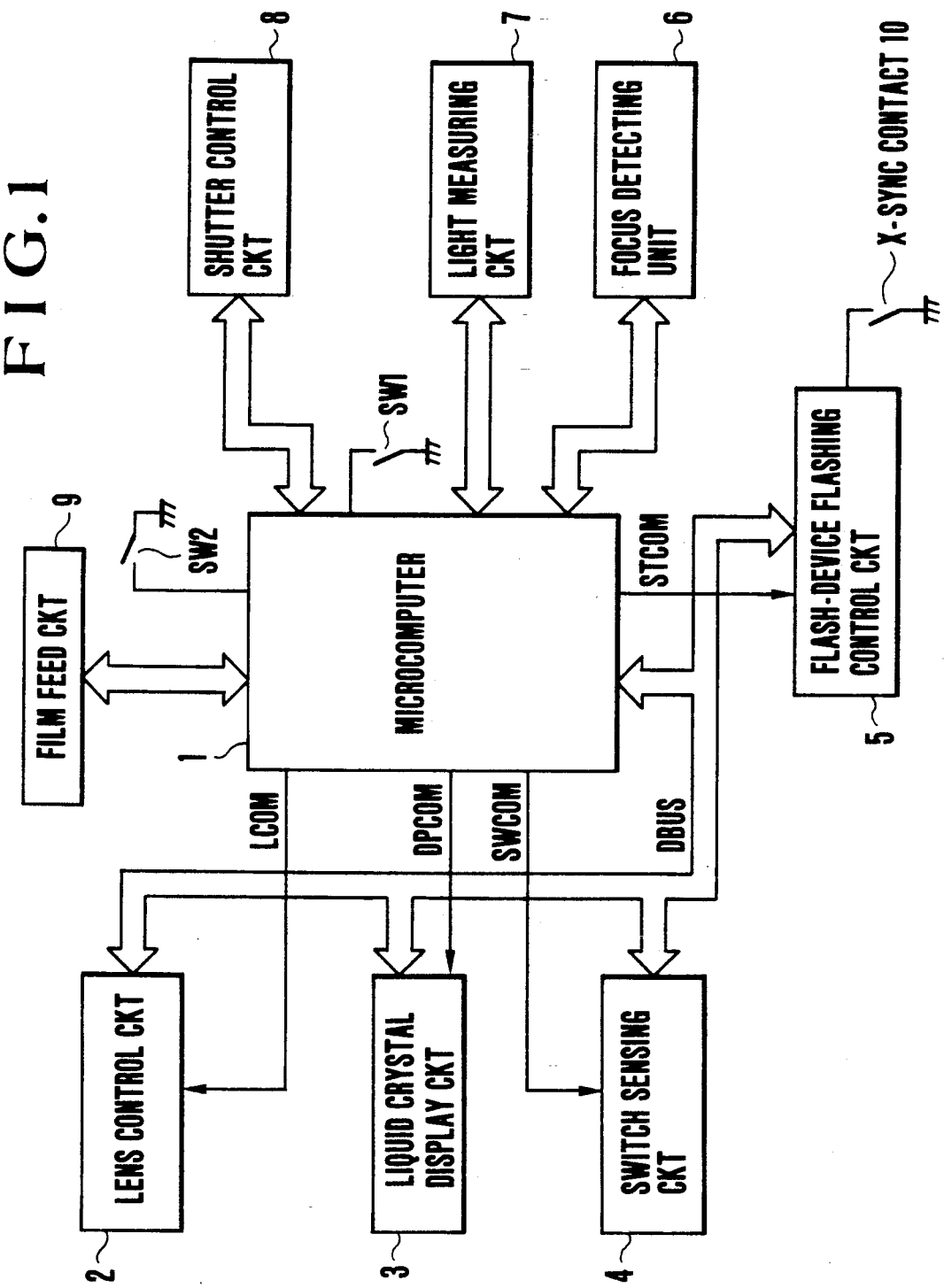
FIG. 1 is a block diagram showing the circuit arrangement of a camera having a synchronized shutter time control device which is arranged as an embodiment of this invention.

FIG. 1 shows electric control blocks of a camera to which this invention is applied.

Referring to FIG. 1, a microcomputer 1 is arranged to control the operation of each part of the camera. A lens control circuit 2 is arranged to control a distance ring and a diaphragm of a photo-taking lens which is not shown. The lens control circuit 2 conducts serial communication with the microcomputer 1 via a data bus DBUS in response to a signal LCOM sent from the microcomputer 1 and controls motors (not shown) in such a way as to control the distance ring and the diaphragm in accordance with the contents of this communication.

A liquid crystal display circuit 3 is arranged to display photographic information on the camera such as shutter speed and aperture control values and so on. The liquid crystal display circuit 3 conducts serial communication with the microcomputer 1 via the data bus DBUS in response to a signal DPCOM sent from the microcomputer 1 and makes a liquid crystal display in accordance with the contents of the communication.

A switch sensing circuit 4 is arranged to read the positions of switches, including a switch for setting the camera in a panoramic shot mode or a flash photography mode and switches indicating the states of the camera. The switch sensing circuit 4 conducts serial communication with the microcomputer 1 via the data bus DBUS in response to a signal SWCOM sent from the microcomputer 1 and thus sends information on the positions of the various switches to the microcomputer 1 through the communication.

A flash-device flashing control circuit 5 is provided for controlling the flashing action of a flash device and adjusts the amount of flash light. The flashdevice flashing control circuit 5 consists of a main capacitor which is an electric charge accumulating part and is arranged to accumulate an electric charge required for flashing; a xenon lamp; a trigger circuit; a TTL light-amount control circuit, etc.

An X-sync contact 10 is arranged to be turned on by the travel of the leading curtain of a shutter unit. The flash-device flashing control circuit 5 causes the flash device to begin to flash when the X-sync contact 10 turns on. A focus detecting unit 6 is a circuit which is arranged to detect, by a known phase-difference detecting method, the focal point of the photo-taking lens for an object to be photographed. The microcomputer 1 either causes the distance ring of the lens to be driven or to determine an in-focus state on the basis of the focused state of the object by driving the focus detecting unit 6.

A light measuring circuit 7 is arranged to measure the luminance of the object through the lens and to send light measurement data to the microcomputer 1. A shutter control circuit 8 is arranged to control the shutter unit which is not shown in accordance with a control signal received from the microcomputer 1. A film feed circuit 9 is arranged to control a film feed motor which is not shown to cause a film winding or rewinding action to be performed in accordance with a control signal sent from the microcomputer 1.

A switch SW1 is interlocked with the shutter release button of the camera. The switch SW1 turns on when the shutter release button is pushed to its first stroke position. A switch SW2 is arranged to turn on when the shutter release button is pushed further to its second stroke position.

Figure 2C:
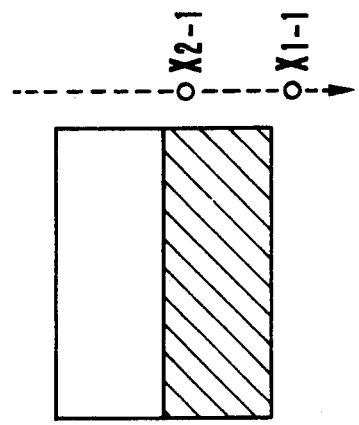
Figure 2B:
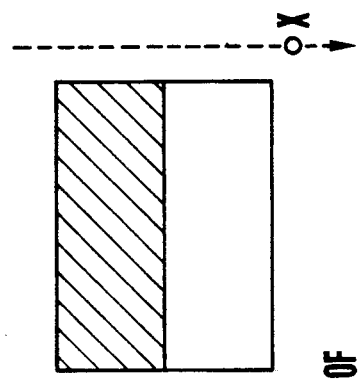
Figure 2A:
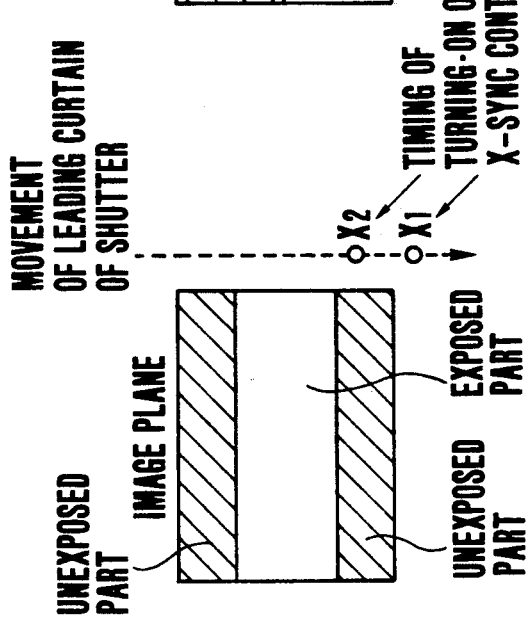

FIGS. 2(a), 2(b) and 2(c) each show a film exposing plane to be exposed for a panoramic shot and the timing of turning-on of the X-sync contact caused by the travel of the leading curtain of the shutter unit.

In taking a panoramic shot, the upper ¼ part and the lower ¼ part of an image plane are covered with light blocking members before making an exposure as indicated by the hatching in FIG. 2(a). As a result, the exposed part of the film becomes a laterally oblong image plane to give a panoramic photograph (a long view from side to side).

In performing a flash photography, the flash device is allowed to flash while the shutter is fully opened. In this instance, the unevenness of exposure due to the so-called slit exposure is normally prevented by allowing the leading curtain of the shutter unit to first travel; by allowing the flash device to flash by turning on the X-sync contact when the full open state of the shutter is obtained; and by allowing the trailing curtain of the shutter unit to travel after completion of the flashing.

In the case of the panoramic shot, since a part of the image plane is blocked from light as mentioned above, the shutter comes to fully open for the panoramic image plane when the leading curtain of the shutter unit reaches a point X2 as shown in FIG. 2(a). Therefore, the point X2 becomes the timing for flashing of the flash device. Meanwhile, in taking a normal shot, the shutter fully opens when the leading curtain of the shutter unit comes to an end point X1 of the image plane. Therefore, this point X1 becomes the timing for flashing of the flash device.

FIG. 2(b) shows another example of taking a panoramic shot. In this case, the upper half of the image plane is covered by a light blocking member. The shutter fully opens at a point X of the movement of the leading shutter curtain for both the panoramic shot and the normal shot. The timing of turning-on of the X-sync contact remains the same both for a normal shot and a panoramic shot.

FIG. 2(c) shows a further example of a panoramic shot. In that case, the panoramic shot is taken by covering the lower half of the image plane with a light blocking member. In FIG. 2(c), a point X2-1 of the movement of the leading shutter curtain represents a point where the shutter comes to fully open for the panoramic shot while another point X1-1 represents a point where the shutter comes to fully open for the normal shot. The X-sync contact is thus arranged to cause the full open point of the shutter for a panoramic shot to differ from the full open point for a normal shot.

In accordance with this invention, the X-sync contact is arranged, for example, to turn on at the point X2 for a panoramic shot to be taken with the image plane partly blocked from light in the manner as shown in FIG. 2(a) and to turn on at another point X1 for a normal shot. Further, in the case of the light blocking state as shown in FIG. 2(c), the X-sync contact is arranged to turn on at the point X2-1 for a panoramic shot and at the point X1-1 for a normal shot.

Figure 3:
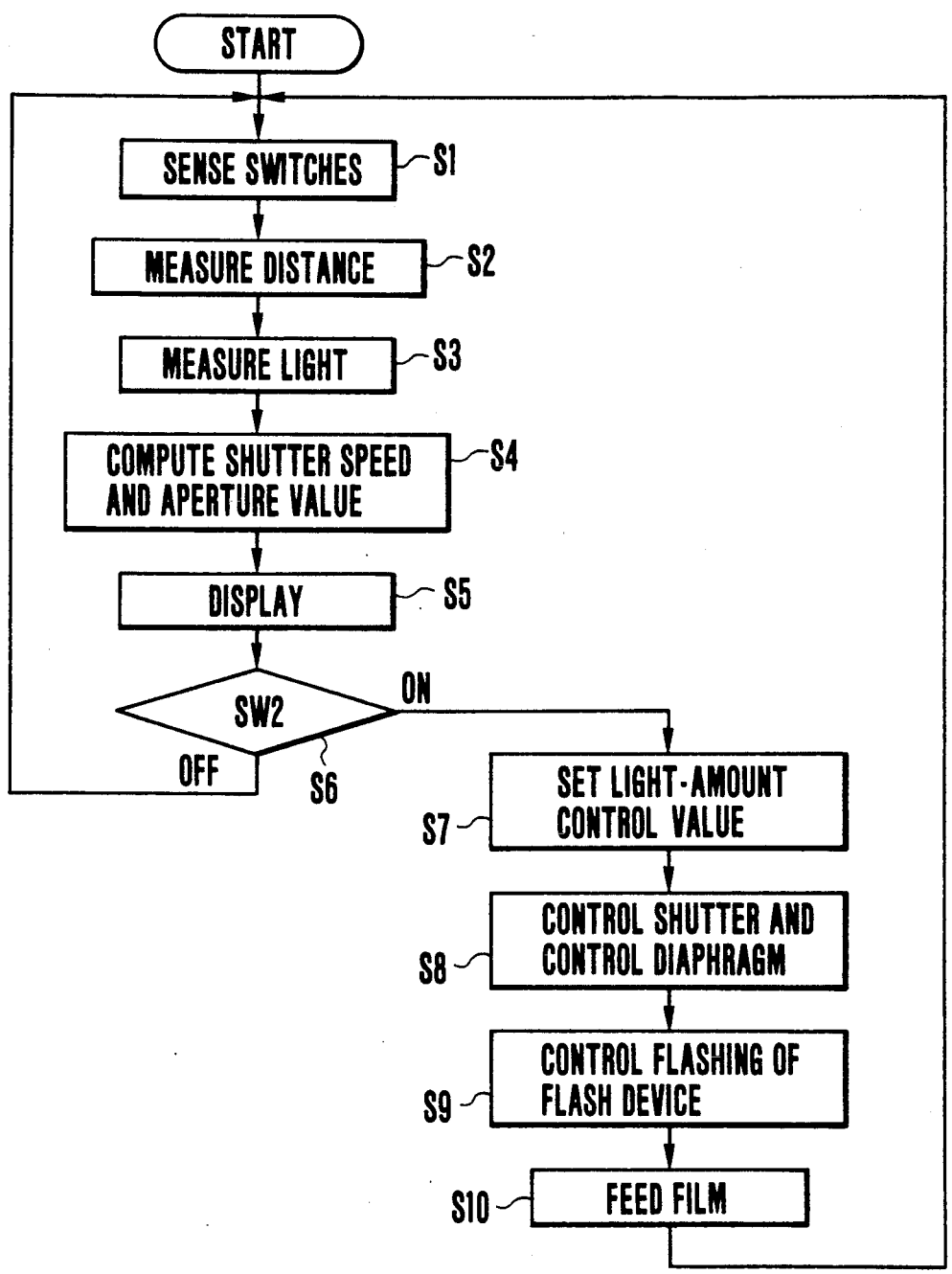
FIGS. 3 and 4 are flow charts showing the operation of the embodiment shown in FIG. 1.

The camera which is arranged according to this invention operates as described below with reference to FIG. 3 which shows a control program in a flow chart:

The program is stored in the ROM of the microcomputer 1 of FIG. 1. At a step S1: The camera begins to operate when the switch SW1 turns on. The microcomputer 1 then communicates with the switch sensing circuit 4 to find the positions of the photographing condition setting switches which show among others whether the camera is set in the panoramic shot mode and also whether the camera is in the flash photography mode. Step S2: The microcomputer 1 drives the focus detecting unit 6 to find the focused state of the object in each of different areas on the image plane, and communicates with the lens control circuit 2 in such a way as to cause the distance ring of the lens to be driven to have the object in focus.

Step S3: The microcomputer 1 causes the light measuring circuit 7 to measure the light of the object. Step S4: A computing operation is performed to decide a shutter speed, an aperture value, etc. Then, if the camera is in the flash photography mode, a limit is set for the shutter time selection. More specifically, the shutter time to be selected is controlled to be a value longer than the X-synchronizing time. If the camera is in the panoramic shot mode, however, the X-synchronizing time can be shortened.

For example, it is assumed that the shutter curtain speed of the camera (a period of time between the appearance of the shutter curtain at the upper end of the image plane and arrival of it at the lower end of the image plane) is 4.8 mS. The flashing time of the flash device is about 1 to 2 mS. Then, with possible errors taken into consideration, the X-synchronizing time is controlled to be 1/125 sec (or 8 mS). In the case of a panoramic shot with the image plane partly blocked from light in the manner as shown in FIG. 2(c), the image plane part which is to be not exposed occupies one-half area of the image plane in the traveling direction of the leading shutter curtain. Accordingly, the curtain speed is virtually reduced to one-half of the speed and thus becomes 2.4 mS. Therefore, the X-synchronizing time becomes faster and thus becomes 1/180 sec (5.6 mS).

Figure 4:
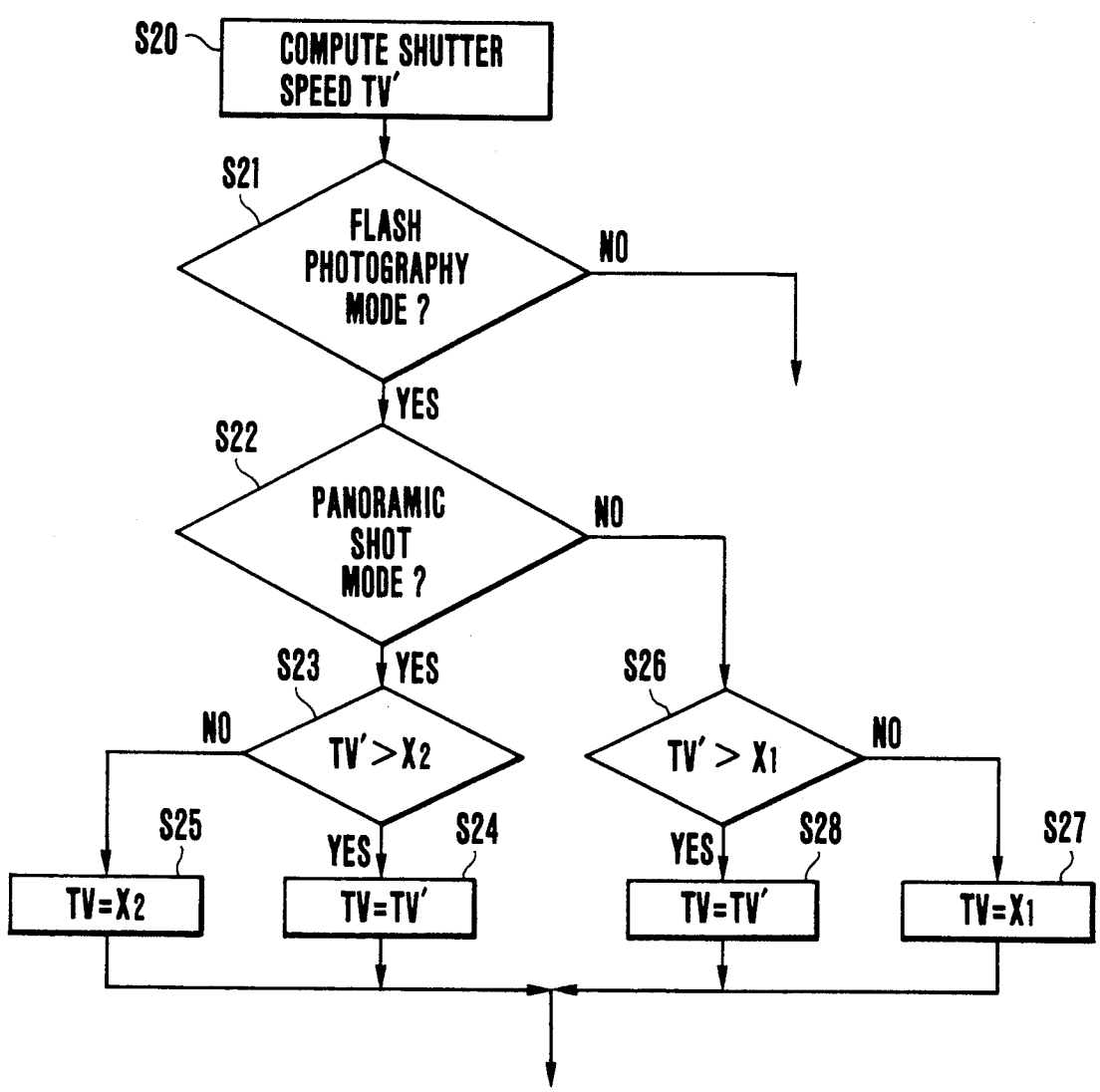

FIG. 4 is a flow chart showing in detail a part of the above-stated step S4. At a step S20 of the flow chart of FIG. 4, a shutter speed TV' is obtained on the basis of the output of the light measuring circuit 7. Step S21: A check is made for the flash photography mode. Step S22: A check is made for the panoramic shot mode.

Assuming that the camera is in the flash photography mode and is also set in the panoramic shot mode, the flow proceeds from the step S22 to a step S23. Step S23: A check is made to find if the shutter speed TV' obtained at the step S20 is longer than the full opening time X2 for a panoramic shot. If so, the flow comes to a step S24 to set the shutter time at the computed shutter time TV'. If not (if the shutter speed TV' is shorter than the full opening time X2), the flow comes to a step S25 to set the shutter time at the full opening time X2, which corresponds to the above-stated speed of 1/180 sec.

In a case where the camera is in the flash photography mode and is not set in the panoramic shot mode, steps S26, S27 and S28 are executed as follows: The shutter time is set at the value TV' if the shutter time value TV' is longer than the full opening time X1 for the normal shot mode. The shutter time is set at the full opening time X1 for the normal shot mode if the shutter time TV' is shorter than the full opening time X1. The full opening time Xl corresponds to the above-stated value 1/125 sec.

Further, in the case of this embodiment, the image plane is assumed to be partly blocked from light with a light blocking member (not shown) in the manner as shown in FIG. 2(c) when the camera is in the panoramic shot mode.

Referring again to FIG. 3, after the shutter time is set at the step S4, the flow comes to a step S5. Step S5: The liquid crystal display circuit 3 is caused to display the shutter time and other photographing conditions. After that, the flow comes to a step S6 to make a check for the state of the switch SW2. If the switch SW2 is found not to have been turned on as yet, the microcomputer 1 repeats the actions of the steps S1 to S6. When the switch SW2 is found to have been turned on at the step S6, the flow proceeds to a sequence of shutter release actions. Step S7: Upon entering the sequence of shutter release actions, the microcomputer 1 communicates with the flash-device flashing control circuit 5 to provide the latter with information on light-amount adjustment obtained on the basis of a film sensitivity value, etc. Step S8: The microcomputer 1 communicates with the lens control circuit 2 to control the diaphragm and drives the shutter control circuit 8 to control the shutter. Then, the leading curtain of the shutter unit is allowed to travel. After the lapse of the shutter time shown in FIG. 4, the trailing curtain of the shutter unit is allowed to travel.

Step S9: When the X-sync contact 10 is caused to turn on by the travel of the leading curtain of the shutter unit, the flash-device flashing control circuit 5 causes the flash device to begin to flash. At the same time, the reflected light from the film surface begins to be measured and integrated. The flash device is stopped from flashing upon attainment of an adequate amount of exposure. Step S10: Upon completion of the exposure, the microcomputer 1 drives the film feed circuit 9 to feed one frame amount of film for a next shot.

The timing of turning-on of the X-sync contact 10 is as follows: In the panoramic shot mode, the X-sync contact 10 turns on at the point X2-1 of FIG. 2(c) as mentioned in the foregoing. In the normal shot mode, the X-sync contact 10 turns on at the point X1-1. Therefore, the flash device is caused to flash when the shutter fully opens both in the panoramic shot and normal shot modes.

Further, the shutter time is controlled to be longer than the full opening time X2 when the camera is in the flash photography mode and, at the same time, is in the panoramic shot mode. When the camera is in the flash photography mode and, at the same time, is in the normal shot mode, the shutter time is controlled to be longer than another full opening time X1. This arrangement ensures the full shutter opening time in any of these modes.

Figure 5:
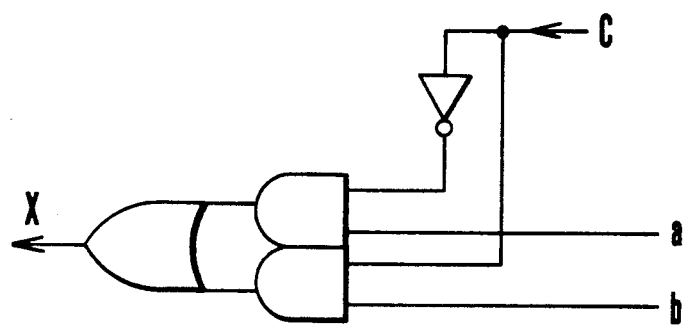
FIGS. 5 and 6 are circuit diagrams respectively showing the arrangement of X-sync contact ON-control circuits which are arranged as embodiments of the invention to control the turning-on of an X-sync contact.

FIG. 5 is a circuit diagram showing, as another embodiment of this invention, an example of a different circuit arrangement for differentiating the timing of a signal indicative of turning-on of the X-sync contact (hereinafter referred to as X contact ON signal) in the panoramic shot mode from the timing of the X contact ON signal in the normal shot mode. The circuit includes an AND gate. An X contact ON signal X1 for the normal shot mode is arranged to be inputted to one input terminal "a" of the AND gate. Another X contact ON signal X2 for the panoramic shot mode is arranged to be inputted to another input terminal "b" of the AND gate. Further, an input terminal "c" is arranged to receive a high-level signal when the camera is set in the panoramic shot mode. In the panoramic shot mode, the flash device is allowed to flash when the X contact ON signal X2 coming to the input terminal "b" turns on.

Meanwhile, in the normal shot mode, the flash device is allowed to flash when the X contact ON signal X1 coming to the input terminal "a" turns on.

In the case of the above-stated embodiment, the X-sync contact is arranged as follows: In taking a panoramic shot in the manner as shown in FIG. 2(c), for example, a first X-sync contact which is arranged to turn on when the shutter curtain travels across one-half of the image plane is connected to the above-stated input terminal "b" and a second X-sync contact which is arranged to turn on when the shutter curtain travels across the whole image plane is connected to the input terminal "a".

Figure 6:
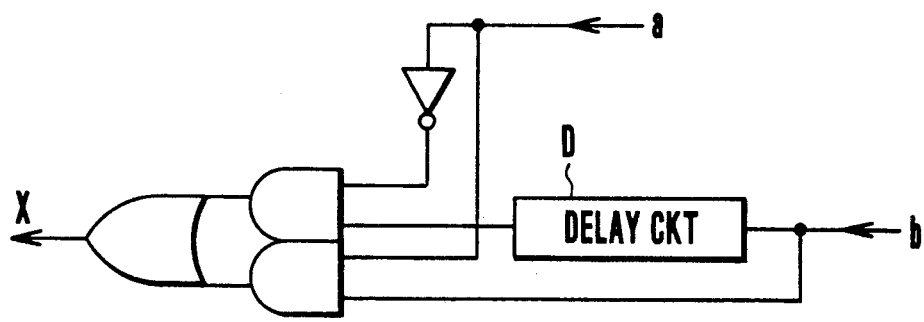

FIG. 6 shows a circuit arrangement as a further embodiment of the invention. The embodiment includes only one X-sync contact for the panoramic shot mode. This X-sync contact is connected to an input terminal "b". Another input terminal "a" is arranged to receive a high-level signal when the panoramic shot mode is selected. A delay circuit D is arranged to operate in response to an X contact ON signal supplied to the input terminal "b". The embodiment is arranged to generate an output after the lapse of a period of time from a point of time at which the X-sync contact turns on in the panoramic shot mode to a point of time at which the shutter fully opens in the normal shot mode.

In a case where a panoramic shot is to be taken in the manner as shown in FIG. 2(c), the embodiment shown in FIG. 6 uses the X-sync contact which turns on when the shutter curtain travels across one-half of the image plane. In this instance, the delay time of the delay circuit D is set at a length of time required for the shutter curtain in traveling from the point X2-1 to the point X1-1 as shown in FIG. 2(c).

In the foregoing, each of the embodiments is described with respect to the arrangement for the panoramic shot mode. However, this invention is not limited to these embodiments described but is applicable also to any cameras as long as they are to be arranged to permit a shot with a part of the image plane being blocked from light in such a way as to shorten the exposed part of the image plane in the traveling direction of the shutter curtain.

For example, the invention is applicable to a multiple exposure to be made by overlapping each other two image planes such as the image planes shown in FIGS. 2(b) and 2(c).

What is claimed is:

1. A camera having a shutter time control circuit arranged to restrict a shutter time to a predetermined shutter time in carrying out flash photography, comprising:
   (a) selection means for selecting a first mode in which a shot is to be taken with an image plane not blocked from light or a second mode in which a shot is to be taken with a part of the image plane blocked from light; and
   (b) an adjustment circuit arranged to adjust the restricted shutter time to a shorter time when the second mode is selected than when the first mode is selected.

2. A camera according to claim 1, wherein said shutter time control circuit is arranged to restrict the shutter time at a longer time than a first length of time when the camera is in the first mode, and to set the shutter time at a longer time than a second length of time which is shorter than the first length of time when the camera is in the second mode.

3. A camera according to claim 1, further comprising flash-device flashing control-signal forming means for forming a trigger signal which triggers a flash device at a first timing corresponding to the restricted shutter time when the camera is in the first mode and for forming another trigger signal which triggers the flash device at a second timing which corresponds to the restricted shutter time adjusted by said adjustment circuit when the camera is in the second mode.

4. A camera according to claim 3, wherein said flash-device flashing control-signal forming means has a first X-sync contact arranged to operate at said first timing in response to the travel of a leading curtain of a shutter and a second X-sync contact arranged to operate at said second timing by the travel of the leading curtain of the shutter.

5. A camera according to claim 4, wherein said shutter includes the leading and trailing curtains arranged to vertically travel.

6. A camera having a shutter time control circuit arranged to restrict a shutter time to a predetermined shutter time in carrying out flash photography, comprising:
(a) selection means for selecting a first mode in which a shot is to be taken with an image plane not blocked from light or a second mode in which a shot is to be taken with a part of the image plane blocked from light; and
(b) a setting circuit arranged to set the shutter time at respective different values for the first mode and the second mode.

7. A camera having a shutter time control circuit arranged to restrict a shutter time to a predetermined shutter time in carrying out flash photography, comprising:
(a) selection means for selecting a first mode in which a shot is to be taken with an image plane not blocked from light or a second mode in which a shot is to be taken with a part of the image plane blocked from light;
(b) a setting circuit arranged to set the shutter time at respective different values for the first mode and the second mode; and
(c) a flashing control circuit arranged to cause timing of flashing of a flash device to differ with the first mode and the second mode.

8. A camera having a shutter time control circuit arranged to restrict a shutter time to a predetermined shutter time in carrying out flash photography, comprising:
(a) selection means for selecting a first mode in which a shot is to be taken with an image plane not blocked from light or a second mode in which a shot is to be taken with a part of the image plane blocked from light; and
(b) a flashing control circuit arranged to cause timing of flashing of a flash device to differ with the first mode and the second mode.

* * * * *